(12) United States Patent
Morgan et al.

(10) Patent No.: US 12,519,609 B1
(45) Date of Patent: Jan. 6, 2026

(54) SIGNATURELESS KEY MATERIAL CAPTURE

(71) Applicant: Halcyon Tech, Inc., Austin, TX (US)

(72) Inventors: Peter Morgan, Scottsdale, AZ (US); Ryan Smith, Austin, TX (US); Kristen Lamb, Austin, TX (US); Clark Lindsey, Loudon, TN (US); Jonathan Miller, Poway, CA (US)

(73) Assignee: Halcyon Tech, Inc., Austin, TX (US)

( * ) Notice: Subject to any disclaimer, the term of this patent is extended or adjusted under 35 U.S.C. 154(b) by 0 days.

(21) Appl. No.: 19/336,382

(22) Filed: Sep. 22, 2025

(51) Int. Cl.
*H04L 9/00* (2022.01)
*H04L 9/40* (2022.01)

(52) U.S. Cl.
CPC .......... *H04L 9/002* (2013.01); *H04L 63/1425* (2013.01)

(58) Field of Classification Search
CPC ............................ H04L 9/002; H04L 63/1425
See application file for complete search history.

(56) References Cited

U.S. PATENT DOCUMENTS

| | | | | |
|---|---|---|---|---|
| 11,657,152 B2* | 5/2023 | Kraemer | ............... | G06F 21/554 726/23 |
| 2019/0018961 A1* | 1/2019 | Kostyushko | ............ | H04L 9/002 |
| 2020/0084236 A1* | 3/2020 | Kallos | ................ | H04L 63/1466 |
| 2021/0232685 A1* | 7/2021 | Kraemer | ............... | G06F 21/554 |

FOREIGN PATENT DOCUMENTS

KR     102403303 B1 *  5/2022  ............. G06F 21/46

* cited by examiner

*Primary Examiner* — Lizbeth Torres-Diaz
(74) *Attorney, Agent, or Firm* — Jones Day (57) ABSTRACT

Techniques for countering ransomware are provided in which key material can be captured, for example, by a telemetry component. The key material is created or otherwise used by a process executing on a monitored computing device and characterizes entropy used by ransomware to generate a ransomware encryption key. This captured key material is used to reconstruct the ransomware encryption key. This key, in turn, is used to decrypt ransomware-encrypted files.

30 Claims, 2 Drawing Sheets

```
┌─────────────────────────────────┐
│ CAPTURE KEY MATERIAL USED BY    │  ╱ 210
│     PROCESS TO GENERATE         │ ╱
│  RANSOMWARE ENCRYPTION KEY      │
└─────────────────────────────────┘
                │
                ▼
┌─────────────────────────────────┐
│    RECONSTRUCT RANSOMWARE       │  ╱ 220
│ ENCRYPTION KEY USING CAPTURED   │ ╱
│         KEY MATERIAL            │
└─────────────────────────────────┘
                │
                ▼
┌─────────────────────────────────┐
│      DECRYPT RANSOMWARE-        │  ╱ 230
│      ENCRYPTED FILES USING      │ ╱
│    RANSOMWARE ENCRYPTION KEY    │
└─────────────────────────────────┘
```

SIGNATURELESS KEY MATERIAL CAPTURE

TECHNICAL FIELD

The subject matter described herein relates to techniques for capturing key material for decrypting ransomware-encrypted files.

BACKGROUND

Ransomware attacks have evolved into highly sophisticated threats, frequently targeting vulnerabilities within specific applications to infiltrate systems, exfiltrate sensitive data, and encrypt critical files. These attacks commonly employ advanced encryption algorithms and automated tools, maximizing operational disruption and intensifying the pressure on victims to pay the demanded ransom. In a typical ransomware scenario, a combination of a single asymmetric key and multiple symmetric keys is used to encrypt files for ransom. The asymmetric key pair is generated using a builder, which may be a traditional compilation-time build system or a post-compilation configuration system. The public portion of the asymmetric key is embedded within the ransomware binary, while the private portion is securely retained on the attacker's server.

Upon execution, ransomware systematically enumerates all applicable files on the compromised system. Some variants generate a single symmetric key for use across all files, while others create a unique symmetric key for each individual file. The symmetric key is used to encrypt the contents of each file, after which the asymmetric public key is used to encrypt the symmetric key, resulting in an encrypted symmetric key. At this stage—or at any point prior to the conclusion of the ransomware process—the original symmetric key is destroyed, preventing recovery by the victim. The encrypted symmetric key is then typically appended to the file, most often as a footer, ensuring that decryption is only possible with access to the corresponding private asymmetric key.

When a victim purchases a decryptor, the decryptor is built or configured with the private portion of the asymmetric key. Upon execution, the decryptor enumerates the ransomware-encrypted files on the system, reads the footer of each file to retrieve the encrypted symmetric key, and uses the private asymmetric key to decrypt it, thereby recovering the symmetric key. The symmetric key is then used to decrypt the file's data, and the footer containing the encrypted symmetric key is removed, restoring the file to its original state.

SUMMARY

Techniques and systems are provided to counteract ransomware by capturing entropy-derived key material from processes executing on monitored computing devices, reconstructing ransomware encryption keys, and decrypting files that have been encrypted by ransomware. The core of the system is a telemetry component that integrates with the operating system by hooking into various entropy sources. These entropy sources, which provide the randomness necessary for cryptographic operations, can include APIs such as CryptGenRandom, BCryptGenRandom, RtlGenRandom, and ProcessPrng, as well as system counters like GetTickCount and QueryPerformanceCounter, hardware-based random-number generators, and CPU instructions that return random values. By intercepting calls to these sources, the telemetry component collects key material that characterizes the entropy consumed by ransomware during the generation of its encryption keys. This captured key material is then analyzed and used to reconstruct the specific ransomware encryption key that was used to encrypt files on the device. Once reconstructed, the key can be applied to decrypt the ransomware-encrypted files, restoring access to the original data. To ensure the accuracy of the reconstructed key, candidate keys can be validated by decrypting a portion of an encrypted file and comparing the output to an expected file header, expected footer and/or magic number, which serves as a signature of successful decryption.

To optimize performance and minimize unnecessary data collection, the system employs a suspiciousness level scoring mechanism that evaluates the likelihood of ransomware activity for each process running on the monitored device. This score is computed based on a variety of behavioral indicators, such as unusual file access patterns, rapid file modifications, or known signatures of ransomware behavior. The telemetry component is configured to enable the capture of key material only when the suspiciousness score for a process meets or exceeds a predefined threshold, thereby focusing resources on processes that are most likely to be malicious. If the score falls below the threshold, the capture is automatically disabled to conserve system resources. The system can also implement a multi-level capture scheme: at a lower, initial threshold, the telemetry component records only metadata about calls to the entropy source, such as timestamps, process identifiers, and the type of entropy source accessed. If the suspiciousness score rises to a higher threshold, the component escalates its monitoring to record the full values returned by the entropy source, providing more comprehensive key material for analysis. This tiered approach allows the system to balance resource consumption with the need for detailed forensic data. Even when capture is disabled, the telemetry component can maintain a rolling buffer containing the most recent key material associated with each process. If a process's suspiciousness score later exceeds the threshold, the system can retrospectively access this buffered data to aid in key reconstruction. Additionally, telemetry data from multiple monitored devices can be aggregated and analyzed centrally, enabling the system to dynamically adjust suspiciousness thresholds in response to emerging threats or changes in the threat landscape.

A dedicated file-gathering component operates in conjunction with the telemetry component to collect detailed information about files that have been encrypted by ransomware. This component scans the file system for encrypted files and extracts a variety of metadata from each file, including header and/or footer-derived data such as the encryption algorithm identifier, key length, encryption tool used, file size, block size, and other relevant file properties. This metadata is crucial for selecting the appropriate key-derivation routine, as different ransomware variants may use different cryptographic algorithms and key management schemes. By analyzing the extracted metadata, the system can determine the most effective method for reconstructing the ransomware encryption key. Once the key has been successfully reconstructed, it is applied to decrypt the affected files, restoring them to their original, unencrypted state. The file-gathering component can also provide feedback to the telemetry component and the central monitoring platform, enabling continuous improvement of detection and decryption strategies.

In a related aspect, when a process that invokes entropy sources is identified and its suspiciousness score meets or exceeds a specified threshold, the telemetry component can actively interpose itself between the process and the entropy source. In this mode, the component substitutes, in real time, the values that would normally be returned by the entropy source with pseudorandom values generated by a deterministic, cryptographically secure pseudorandom number generator, such as an AES-CTR-DRBG or Fortuna instance. The seed used to initialize the deterministic generator, along with associated data sufficient to reconstruct the exact sequence and order of pseudorandom values supplied to the process, is securely persisted and linked to the relevant process and/or thread identifier. This approach ensures that, even if the ransomware attempts to generate its own encryption key using what it believes to be high-entropy random data, the system can later regenerate the exact same pseudorandom stream from the stored seed. By replaying the ransomware's key-derivation routine with the regenerated stream, the system can accurately reconstruct the encryption key used by the ransomware. The substitution of pseudorandom values is enabled only while the suspiciousness score remains above the threshold, and the system can escalate to a higher level of capture if the score increases further. All persisted seeds and associated identifiers are transmitted to a remote monitoring platform via a secure, end-to-end encrypted messaging bus, ensuring that sensitive data is protected during transmission and available for centralized analysis and response.

A comprehensive system implementing these techniques can include several integrated components working together to detect, analyze, and remediate ransomware attacks. At the endpoint level, at least one monitored computing device runs a telemetry component that is responsible for capturing key material created or used by processes on the device, as well as a file-gathering component that extracts detailed metadata from ransomware-encrypted files. These components operate in real time, continuously monitoring system activity and collecting data relevant to ransomware detection and key reconstruction. The monitored device is communicatively coupled to a remote monitoring platform, which serves as the central hub for analysis and response. The remote platform includes a key reconstruction module that leverages the captured key material and file metadata to reconstruct the ransomware encryption key, as well as a decryption module that applies the reconstructed key to decrypt affected files. The system architecture supports secure, end-to-end encrypted communication between the endpoint and the remote platform, ensuring the confidentiality and integrity of all transmitted data. Additionally, the telemetry component and its associated logic can be remotely updated with revised entropy hooks, detection algorithms, or decryption logic in response to the identification of new ransomware variants or changes in attack techniques. The system can aggregate telemetry data from a large number of monitored devices, enabling it to identify emerging threats, adjust suspiciousness thresholds dynamically, and coordinate a rapid, automated response to ransomware incidents across an entire organization or network. Captured key material, process identifiers, and other relevant data are securely transmitted to the remote platform, where they are stored, analyzed, and used to inform ongoing threat intelligence and defensive measures.

In a first aspect, key material is captured by a telemetry component from a process executing on a monitored computing device. The key material characterizes entropy consumed by ransomware to generate a ransomware encryption key. The captured key material is used to reconstruct the ransomware encryption key, which is then employed to decrypt ransomware-encrypted files.

The telemetry component captures key material via one or more hooks into operating-system entropy sources on the monitored computing device.

A suspiciousness level score indicative of the likelihood of ransomware activity is computed. The telemetry component is configured to capture key material only when the suspiciousness level score meets or exceeds a predefined threshold.

One or more suspiciousness level scores associated with execution of the process are received (e.g., by the telemetry component and/or an agent on the monitored device, or generated locally). When the score(s) meet or exceed a threshold, the telemetry component enables capture of key material; when the score(s) fall below the threshold, capture is disabled.

In some variations, a multi-level scheme is employed in which capture at a first level is enabled when the score meets a first threshold, and capture at a second, higher level is enabled when the score meets a second threshold. The second level (i) consumes more computing resources than the first and (ii) yields a greater volume of key material. Capture is disabled when the score is below the first threshold.

A file-gathering component obtains information about ransomware-encrypted files to determine whether to use the reconstructed ransomware encryption key for decryption. The information can include header and/or footer-derived data specifying one or more of an algorithm identifier, key length, or encryption tool, as well as file size, block size, and file properties.

Capturing the key material can include hooking, by the telemetry component, at least one operating-system entropy source selected from CryptGenRandom, BCryptGenRandom, RtlGenRandom, ProcessPrng, GetTickCount, QueryPerformanceCounter, and a hardware-based random-number generator.

The telemetry component can operate in a multi-tier capture mode that, at a first suspiciousness threshold, records metadata describing calls to the entropy source and, at a higher threshold, records full values returned by the entropy source.

The techniques can further include tampering with an entropy source invoked by the process by substituting, in real time, pseudorandom values generated by a deterministic cryptographically secure pseudo-random number generator, and persisting the generator's seed for later reconstruction of the ransomware encryption key.

Telemetry data can be aggregated from multiple monitored computing devices to dynamically adjust the suspiciousness threshold applied to the process.

While disabled, the telemetry component can maintain a rolling buffer of most-recent key material for the process and provide retrospective access to that subset if the suspiciousness level score later exceeds the threshold.

The file-gathering component can extract, from each ransomware-encrypted file, metadata comprising at least one of: an encryption algorithm identifier, a key length, a block size, or a file property. Based on such metadata, a key-derivation routine for reconstructing the ransomware encryption key can be selected.

Reconstructing the ransomware encryption key can include validating a candidate key by decrypting a portion of at least one ransomware-encrypted file and comparing the output with an expected header, expected footer, and/or magic number.

The captured key material and associated process identifiers can be transmitted to a remote monitoring platform via a secure, end-to-end encrypted messaging bus.

The telemetry component can be remotely updated with revised entropy hooks or decryption logic upon identification of a new ransomware variant.

In an interrelated aspect, a system for decrypting ransomware-encrypted files includes at least one monitored computing device having a telemetry component configured to capture key material created or used by a process on the device, the key material characterizing entropy used by ransomware to generate a ransomware encryption key. The device further executes a file-gathering component configured to obtain information about ransomware-encrypted files on the device. A remote monitoring platform, communicatively coupled to the device, includes a key reconstruction module configured to reconstruct the ransomware encryption key using the captured key material and the obtained information, and a decryption module configured to decrypt the ransomware-encrypted files using the reconstructed key.

The telemetry component can be further configured to receive, for each process, a suspiciousness level score indicative of ransomware likelihood, and to enable capture of key material only when the score meets or exceeds a predefined threshold.

The file-gathering component can be further configured to extract, from each ransomware-encrypted file, metadata comprising at least one of: an encryption algorithm identifier, a key length, a block size, or a file property, and to provide the metadata to the key reconstruction module for use in reconstructing the ransomware encryption key.

In some aspects, a process executing on a monitored computing device that invokes one or more entropy sources can be identified. When a suspiciousness score associated with the process meets or exceeds a threshold, a telemetry component can be interposed between the process and at least one of the entropy sources. In such cases, pseudorandom values generated by a deterministic cryptographically secure pseudorandom number generator can be substituted, in real time, for values that would otherwise be returned by the entropy source. The seed of the deterministic generator, along with associated data sufficient to determine the order in which the pseudorandom values were supplied to the process, can be persisted. At least one ransomware encryption key used by the process can be reconstructed by regenerating, from the persisted seed, the pseudorandom values supplied to the process and replaying a key-derivation routine implemented by the ransomware. Ransomware-encrypted files can then be decrypted using the reconstructed ransomware encryption key.

The substituting of pseudorandom values can be enabled only while the suspiciousness score meets or exceeds a threshold and can be disabled when the suspiciousness score falls below the threshold. A higher suspiciousness score threshold can trigger substituting at a higher level of capture than a lower threshold.

Interposing the telemetry component can include hooking one or more operating-system entropy sources, such as CryptGenRandom, BCryptGenRandom, RtlGenRandom, ProcessPrng, GetTickCount, QueryPerformanceCounter, a hardware-based random-number generator, or a CPU instruction that returns random values.

The deterministic generator can comprise an AES-CTR-DRBG or Fortuna instance, and persisting the seed can include storing the seed in association with at least one of a process identifier or a thread identifier.

A reconstructed ransomware encryption key can be validated by decrypting a portion of at least one ransomware-encrypted file and comparing the decrypted portion with an expected header, expected footer, and/or magic number.

The persisted seed and associated process identifiers can be transmitted to a remote monitoring platform via an end-to-end encrypted messaging bus.

In another aspect, a suspiciousness level score indicative of a likelihood of ransomware activity can be received for a process executing on a monitored computing device. While the suspiciousness level score is below a first threshold, a telemetry component can maintain a rolling buffer containing a most-recent subset of key material generated or used by the process. When the suspiciousness level score meets or exceeds the first threshold, the telemetry component can hook one or more operating-system entropy sources invoked by the process and record metadata describing calls to the entropy sources. When the suspiciousness level score meets or exceeds a higher, second threshold, full values returned by the entropy sources can be recorded. Metadata can be extracted from ransomware-encrypted files on the monitored computing device, such as an encryption algorithm identifier, a key length, a block size, or a file property. Based at least in part on the extracted metadata, a key-derivation routine can be selected. A ransomware encryption key can be reconstructed using key material obtained from at least one of the rolling buffer or the recorded full values and the selected key-derivation routine, and at least one of the ransomware-encrypted files can be decrypted using the reconstructed ransomware encryption key.

Telemetry data from a plurality of monitored computing devices can be aggregated, and at least one of the first threshold or the second threshold can be dynamically adjusted based on the aggregated telemetry data.

Recording metadata at the first threshold can consume fewer computing resources and yield less key material than recording full values at the second threshold.

The telemetry component can be remotely updated with revised entropy hooks or decryption logic responsive to identification of a new ransomware variant.

Non-transitory computer program products, which are physically embodied on tangible media, are also disclosed. These products store instructions that, when executed by one or more data processors of one or more computing systems, cause the data processor(s) to perform the operations described herein. Likewise, computer systems are described that may include one or more data processors and memory coupled to those processors. The memory may temporarily or permanently store instructions that, when executed, direct at least one processor to carry out one or more of the operations detailed in this disclosure.

Furthermore, the described techniques may be implemented by one or more data processors, either within a single computing system or distributed across multiple computing systems. These computing systems may be interconnected and capable of exchanging data, commands, or other instructions through one or more communication links. Such links may include, but are not limited to, network connections (such as the Internet, wireless wide area networks, local area networks, wide area networks, or wired networks), as well as direct connections between two or more computing systems.

The current subject matter provides many technical advantages. In particular, the current techniques provide for techniques for decrypting ransomware-encrypted files across different encryption schemes. Further, these techniques are advantageous in that the need for computationally expensive signatures or fingerprints characterizing each possible encryption scheme are obviated.

The details of one or more variations of the subject matter described herein are set forth in the accompanying drawings and the description below. Other features and advantages of the subject matter described herein will be apparent from the description and drawings, and from the claims.

DETAILED DESCRIPTION

The present subject matter relates to advanced techniques for generating or identifying symmetric keys used to decrypt files encrypted by ransomware. Specifically, the disclosed techniques focus on capturing key material, such as entropy-related information, to facilitate the generation of symmetric keys. This approach eliminates the necessity of paying a ransom to malicious actors. The entropy-related information is particularly advantageous because ransomware programs generally obtain randomness from a limited and well-defined set of sources. Even if a ransomware variant does not utilize one of these known sources, it remains possible to derive the symmetric key through alternative methodologies.

The principal tradeoff associated with capturing key material, as opposed to the keys themselves, is the requirement to reconstruct the encryption key for each individual ransomware instance. This reconstruction process can involve computationally intensive reverse engineering to analyze and replicate the specific algorithm employed by the ransomware to convert key material into a symmetric key. Once this transformation or mapping has been accurately replicated, the symmetric keys can be reproduced, thereby enabling the decryption of files affected by the ransomware.

Figure 1:
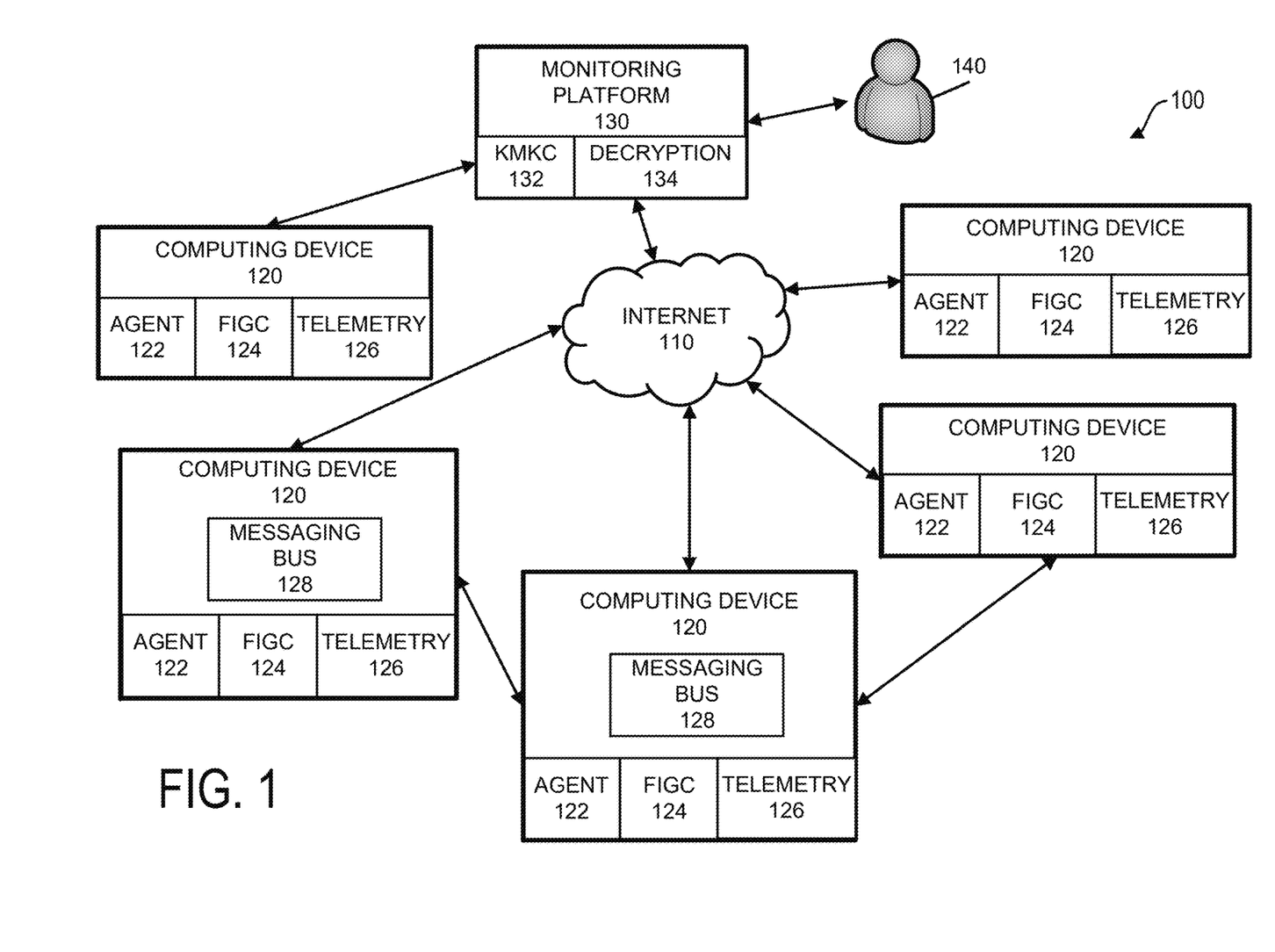
FIG. 1 is an architecture diagram illustrating aspects of a security monitoring platform in which agents are installed on computing devices.

FIG. 1 is an architecture diagram 100 in which a monitoring platform 130 can monitor and protect a plurality of computing devices 120 (e.g., endpoints, etc.) by way of the Internet 110 or by way of direct connections (e.g., on-premise protection, etc.). Each of the monitored computing devices 120 can include or otherwise execute at least one agent 122 which can execute or interface with a file information gathering component (FIGC) 124 and a telemetry component 126. The monitoring platform 130 can execute numerous security-related rules, heuristics, and machine learning models to help prevent and/or counter a ransomware attack. The monitoring platform 130 can be overseen by a security operations center (SOC) 140 which, in some cases, can manually initiate (e.g., initiate procedures by way of user-generated input into a graphical user interface on a remote computing system, etc.) one or more of the processes described herein.

The telemetry components 126 can be executed on the computing device and can individually or in combination be used to locally analyze security events and/or to transmit data to the monitoring platform 130 (e.g., cloud-based platform, etc.) which characterize security events. In some cases, the telemetry component 126 solely works locally while, in other variations, the telemetry component 126 works in coordination with the monitoring platform 130.

In some cases, some or all of the functionality of the monitoring platform 130 can be performed, for example, locally on the computing device 120 (e.g., by the agent 122, the FIGC 124 and/or the telemetry component 126). In other cases, there is an orchestration between one or more of the computing devices 120 and the monitoring platform 130.

In some cases, the computing device 120 can execute a messaging bus 128 which selectively processes and transmits messages characterizing security events. The messaging bus 128 can generate, process, and transmit messages that are derived from security events generated or identified by the agent 122, the FIGC 124, or the telemetry component 126 and/or from other sources executing on the corresponding computing device 120 or a peer computing device 120. Further details regarding the messaging bus 128 can be found in U.S. Pat. No. 12,130,914, the contents of which are hereby fully incorporated by reference. In some cases, the computing device 120 can also execute a kernel model such as described in U.S. patent application Ser. No. 19/084,548 filed on Mar. 19, 2025, the contents of which are hereby fully incorporated by reference.

In some cases, the agent 122 can be installed after a security event such as a ransomware attack. With this example, ransomware has already infiltrated at least one of the computing devices 120 and encrypted certain files for which a decryption key will be provided in exchange for a ransomware payment. In such cases, the agent 122 can be installed on the computing device(s) 120 to facilitate remediation of the security event. In the case of ransomware, the remediation can include decrypting the encrypted files and/or transporting the encrypted files to the monitoring platform 130 (or to a different cloud-based service).

In order to facilitate local decryption, the agent 122 can collect information characterizing the encrypted files using the FIGC 124. For example, the FIGC 124 can identify or generate a list of files that were encrypted as well as the key material used in the encryption of each particular file. In order to identify the encrypted files, an algorithm can analyze the file name, extension and contents of a particular file to see if it is encrypted. Key material, in this context, refers to variables needed to create a key which can be dependent on the utilized encryption algorithm. The encryption information can be used to generate and deliver decryptor logic (i.e., logic/code to decrypt encrypted files) in the form of a surveyor transported in the form of a surveyor package. A surveyor can be a standalone component that can be run by the agent 122 in order to extend the functionality of the agent 122. The surveyor, when executed by the agent 122, can cause the encrypted files to be decrypted. In some cases, even if the decryptor logic is the same (i.e., a same encryption technique is used for all files), the key materials for each file might be different. Further details regarding surveyors and the updating of agents can be found in U.S. patent application Ser. No. 18/948,343 filed on Nov. 14, 2024, the contents of which are hereby fully incorporated by reference.

The monitoring platform 130 can take telemetry data from the telemetry components 126 on the computing devices 120 (i.e., endpoints, etc.) and use individual endpoint telemetry data and telemetry from a plurality of endpoints, determines the current likelihood that a ransomware or other malicious attack is underway by deriving a risk level. The telemetry components 126 can, by way of the respective messaging buses 128, individually transmit data characterizing information such as intra-process and inter-process behavior, static analysis of machine instructions, and authentication anomalies. This information can be aggregated by the monitoring platform 130 across multiple computing devices 120 to provide higher level computing environment telemetry such as patterns among computing device 120, and telemetry from network devices in order to determine the likelihood that an attack is taking place.

The agent 122 can determine a suspiciousness score which is indicative of the likelihood of a ransomware attack occurring. In some cases, the suspiciousness score can be generated, at least in part, based on signaling from the monitoring platform 130 which has greater visibility into overall computing environment (i.e., the monitoring platform 130 interacts with different, related computing devices 120, etc.). The suspiciousness score can be based on various factors such as scrambled or inaccessible files, atypical file extensions, locked computer systems or applications, unexpected network activity such as increased traffic from unknown sources, unexpected data transfers and/or connections to unknown services, ransom demands, unsuccessful application or system authentication requirements, system performance degradation, malware tool interference, unfamiliar or atypical processes (e.g., RMM tools, etc.), and the like. The suspiciousness score can be calculated using rules, heuristics, and/or machine learning models. The suspiciousness scores can, for example, be on a process-by-process basis and/or on a system-wide basis. The agent 122 can continually update the suspiciousness score throughout the process lifetime based on behavior; both for the process and the system (i.e., the monitored computing device 120). The agent can also cause the telemetry component 126 to be loaded for every process on the system. The agent 122 can be responsible for conveying the initial process suspiciousness level to the telemetry component 126 and updating the telemetry component 126 with the suspiciousness level when there are changes. The agent 122 can also receive key material from the telemetry component 126 (as described in further detail below). The agent 122 can store the key material locally and/or transmit it to the monitoring platform 130.

As noted above, the input to the telemetry component 126 can include the system-wide suspiciousness level and the process-specific suspiciousness level from the agent 124. In addition, the telemetry component 126 can be configured to execute a policy that dictates how it operates based on various suspiciousness levels. The telemetry component 126 can sit between the process and the operating system. If the suspiciousness level is low enough, then the telemetry component 126 is disabled. This disabling has the benefit that the user of the monitored computing device 120 will not experience increased overhead for legitimate processes when legitimate operations are taking place. This is an important point since attempting to capture key material for all processes system-wide has a negative impact on the system performance, as well as operational overhead/cost for remote monitoring (including generation of superfluous network traffic within an organization). If the initial state of the suspiciousness levels does not merit enabling telemetry, the telemetry component 126 can be enabled at a later time if suspiciousness levels rise. This is an important point because it may be the case that the appropriateness to capture key material may only be discovered via behavioral analysis of the process, or that a legitimate process is hijacked. While the telemetry component 126 is disabled, it can still passively store the most recent key material for the process so that if there the suspiciousness level rises after key material has already been generated, a subset of the previously generated key material can be accessed. If the telemetry component 126 is enabled, then it can hook one or more operating system sources of key material. The operating system sources of key material can include one or more of: ProcessPrng, CryptGenRandom, BCryptGenRandom, RtlGenRandom, GetTickCount, Query Performance Counter, Windows per-process entropy (e.g., process base PRNG, per-processor PRNG, BCryptGenRandom, etc), and the like. The operating system sources can also include the underlying sources of entropy including entropy sources such as interrupt timings, hardware RNG, UEFI entropy, RDRAND CPU instructions, system time and counters, OEMO ACPI table content, keyboard/input device movements, memory status, free disk clusters, and the like. The underlying sources can also include information generated by entropy pools such as multiple pools, round-robin distribution, SHA-512 hashing, and the like. The underlying source can also include PRNG hierarchy information such as root PRNG, per-processor PRNGs, processor base PRNG, per-processor PRNGs, Deterministic-random-bit-generator (DRBGs) algorithms such as AES-CTR-DRBG, and the like. Additionally, the telemetry component 126 can hook CPU instructions that are sources of entropy such as RDRAND.

When these hooks are invoked, the telemetry component 126 can copy the key material that is produced or otherwise captured by such hooks and send it to the agent 126. Additionally, when these sources are invoked, and the process is deemed suspicious, the agent 122 or the monitoring platform 130 can sometimes determine that the best course of action is to tamper with the entropy. That is, produce a value that, while still pseudo-random, the value can be determined at a later time. In practice, this tampering can be achieved by redirecting the suspicious process away from the normal system entropy source and instead supplying values from a deterministic cryptographically secure pseudo-random number generator (CSPRNG), such as AES-CTR-DRBG or Fortuna, under the control of the monitoring system. Because the sequence of outputs from the CSPRNG is fully determined by its seed, only the seed needs to be retained to reconstruct the entire stream of random values later. This tampering obviates the need to store and record the information and could be implemented in a secure fashion by limiting the processes to those deemed suspicious.

In the case of a ransomware attack, the agent 122 can send an instruction to the FIGC 124 to gather information about the attack. This instruction can be initiated either directly by the agent 122 or by the monitoring platform 130 (which can be, in turn, initiated by the SOC 140). The FIGC 124 can then enumerate the ransomware-encrypted files on the monitored computing device 120 and/or on peripheral file storage systems. The FIGC 124 then extracts information from these files for use by the agent 122 or the cloud monitoring platform 130 which can be used to decrypt the ransomware-encrypted files. In the case of files with footers and/or headers, the extracted information can include metadata about the underlying encryption process (e.g., utilized algorithm, key length, specific encryption tool, etc.). If a file lacks a footer and/or header or does not explicitly reveal an encryption method, the extracted information can characterize entropy, file size, block size (to see if blocks align with a size of a known encryption algorithm), file properties, and the like. The FIGC 124 can also be used to determine whether a correct encryption key has been derived through key material. In practice, this determination can be performed by replaying the exact key-generation routine that the ransomware uses, which is possible because the encryptor binary has been reverse engineered and its use of entropy and key derivation is fully understood. By reproducing the ransomware's sequence of operations with the captured or controlled entropy values, the system can regenerate the precise symmetric keys that were originally used for encryption. Verification can then be achieved by decrypting a portion of a file and comparing the output against expected structures such as known headers, magic numbers, or other predictable file content. Because both the key derivation and the verification process are deterministic and lightweight, this entire procedure can be executed with high confidence.

The cloud monitoring platform 130 can execute a key material to key component (KMKC) 132 and a decryption component 134. In some variations, the KMKC 132 and/or the decryption component 134 are executed on the monitored computing device 120 or on a different, remote computing system. The KMKC 132 takes the key material from the agent 122 or from the monitoring platform 130. The KMKC 132 can then duplicate the ransomware key material to symmetric encryption key transformation as determined by the decryption component 134 (described in more detail below). The KMKC 132 can use the information from the FIGC 124 to determines to which file a symmetric encryption key belongs. The output of the KMCK 132 is the file to symmetric key mapping for the ransomware-encrypted files.

The decryption component 134 can take as input the symmetric key mapping for ransomware-encrypted files and, through reverse engineering of the ransomware, reproduce the ransomware's decryption operations. The decryption component effectively encodes the logic necessary to implement decryption for the cryptographic primitives used by the offending ransomware encryptor. Since ransomware is by definition reversible, instead of destructive, all encryption operations will have a corresponding decryption operation. This decryption component 134 can repeat this or each entry of a ransomware-encrypted file to symmetric key mapping. The result is that the original data is restored (e.g., decrypted without paying a ransom, etc.).

Figure 2:
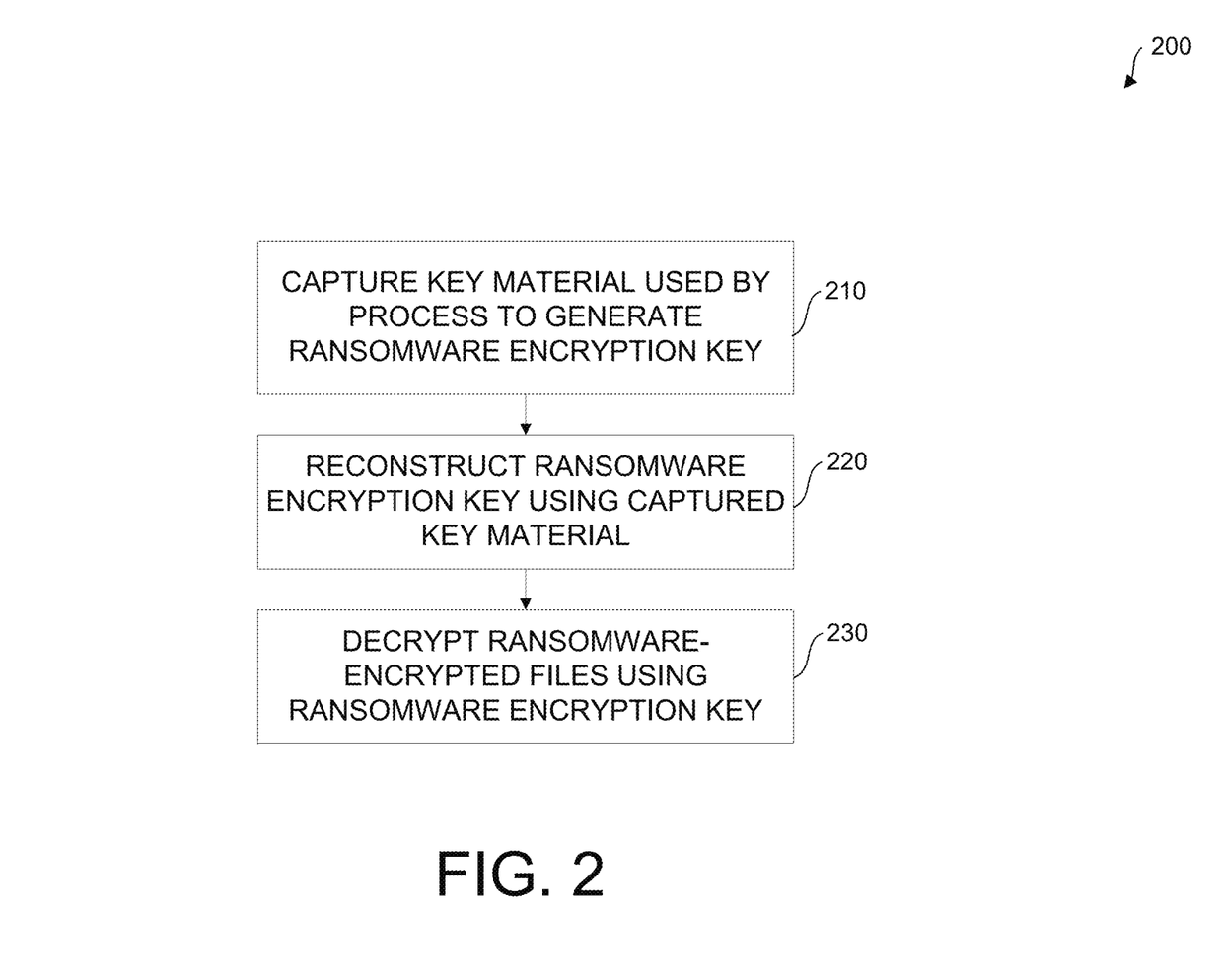
FIG. 2 is a process flow diagram illustrating signatureless key material capture for decryption of ransomware-encrypted files.

FIG. 2 is a process flow diagram 200 in which, at 210, a telemetry component captures key material being executed or otherwise used by a process executing on a monitored computing device. The key material can characterize entropy used by ransomware to generate a ransomware encryption key. Characterizes in this context means to identify the entropy or to provide information from which the entropy can be derived. The capture of the key material by the telemetry component can, in some variations, be triggered by a suspiciousness level score (indicative of a ransomware attack) being equal to or exceeding a threshold. This captured key material is later used, at 220, to reconstruct the ransomware encryption keys (e.g., symmetric keys for files and asymmetric keys, if generated). For example, one or more reverse engineering processes can be implemented to convert or otherwise associate the key material with a particular encryption key. Ransomware-encrypted files associated with the ransomware encryption key are later, at 230, decrypted.

Various implementations of the subject matter described herein may be realized in digital electronic circuitry, integrated circuitry, specially designed ASICs (application specific integrated circuits), computer hardware, firmware, software, and/or combinations thereof. These various implementations may include implementation in one or more computer programs that are executable and/or interpretable on a programmable system including at least one programmable processor (e.g., CPU, GPU, etc.), which may be special or general purpose, coupled to receive data and instructions from, and to transmit data and instructions to, a storage system, at least one input device, and at least one output device.

These computer programs (also known as programs, software, software applications or code) include machine instructions for a programmable processor, and may be implemented in a high-level procedural and/or object-oriented programming language, and/or in assembly/machine language. As used herein, the term "machine-readable medium" refers to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

To provide for interaction with a user, the subject matter described herein may be implemented on a computing device having a display device (e.g., a LED, OLED, or LCD screen/monitor) for displaying information to the user and a keyboard and an input device (e.g., mouse, trackball, touchpad, touchscreen, etc.) by which the user may provide input to the computing device. Other kinds of devices may be used to provide for interaction with a user as well; for example, feedback provided to the user may be any form of sensory feedback (e.g., visual feedback, auditory feedback, or tactile feedback); and input from the user may be received in any form, including acoustic, speech, or tactile input.

The subject matter described herein may be implemented in a computing system that includes a back-end component (e.g., as a data server), or that includes a middleware component (e.g., an application server), or that includes a front-end component (e.g., a client computer having a graphical user interface or a Web browser through which a user may interact with an implementation of the subject matter described herein), or any combination of such back-end, middleware, or front-end components. The components of the system may be interconnected by any form or medium of digital data communication (e.g., a communication network). Examples of communication networks include a local area network ("LAN"), a wide area network ("WAN"), and the Internet.

The computing system may include clients and servers. A client and server are generally remote from each other and typically interact through a communication network. The relationship of client and server arises by virtue of computer programs running on the respective computers and having a client-server relationship to each other.

In the descriptions above and in the claims, phrases such as "at least one of" or "one or more of" may occur followed by a conjunctive list of elements or features. The term "and/or" may also occur in a list of two or more elements or features. Unless otherwise implicitly or explicitly contradicted by the context in which it is used, such a phrase is intended to mean any of the listed elements or features individually or any of the recited elements or features in combination with any of the other recited elements or features. For example, the phrases "at least one of A and B;" "one or more of A and B;" and "A and/or B" are each intended to mean "A alone, B alone, or A and B together." A similar interpretation is also intended for lists including three or more items. For example, the phrases "at least one of A, B, and C;" "one or more of A, B, and C;" and "A, B, and/or C" are each intended to mean "A alone, B alone, C alone, A and B together, A and C together, B and C together, or A and B and C together." In addition, use of the term "based on," above and in the claims is intended to mean, "based at least in part on," such that an unrecited feature or element is also permissible.

The subject matter described herein can be embodied in systems, apparatus, methods, and/or articles depending on the desired configuration. The implementations set forth in the foregoing description do not represent all implementations consistent with the subject matter described herein. Instead, they are merely some examples consistent with aspects related to the described subject matter. Although a few variations have been described in detail above, other modifications or additions are possible. In particular, further features and/or variations can be provided in addition to those set forth herein. For example, the implementations described above can be directed to various combinations and subcombinations of the disclosed features and/or combinations and subcombinations of several further features disclosed above. In addition, the logic flows depicted in the accompanying figures and/or described herein do not necessarily require the particular order shown, or sequential order, to achieve desirable results. Other implementations may be within the scope of the following claims.

What is claimed is:

1. A method for implementation by one or more computing devices comprising:
   receiving, for a process executing on a monitored computing device, a suspiciousness level score indicative of a likelihood of ransomware activity;
   capturing, by a telemetry component, key material being created or otherwise used by the process, the key material characterizing entropy used by ransomware to generate a ransomware encryption key, the capturing comprising:
      enabling capture of the key material by the telemetry component at a first level when the suspiciousness level score is at or above a first threshold;
      enabling capture of the key material by the telemetry component at a second level when the suspiciousness level score is at or above a second threshold, the capturing at the second level (i) consuming a greater amount of computing resources than the first level and (ii) providing a greater amount of key material than the first level; and
      disabling capture of the key material by the telemetry component when the suspiciousness level score is below the first threshold;
   reconstructing the ransomware encryption key using the captured key material; and
   decrypting ransomware-encrypted files using the reconstructed ransomware encryption key.

2. The method of claim 1, wherein the telemetry component captures the key material using one or more hooks into entropy sources forming part of an operating system executed by the monitored computing device.

3. The method of claim 1 further comprising:
   obtaining, by a file gathering component, information about the ransomware-encrypted files;
   wherein the obtained information is used to determine whether to use the ransomware encryption key to decrypt the ransomware-encrypted files.

4. The method of claim 3, wherein the obtained information comprises information derived from a header and/or footer of one or more of the ransomware-encrypted files, the header and/or footer specifying one or more of a utilized algorithm, a key length, or a utilized encryption tool.

5. The method of claim 3, wherein the obtained information comprises one or more of file size, block size, and file properties.

6. The method of claim 1, wherein capturing the key material further comprises hooking, by the telemetry component, at least one operating-system entropy source comprises one or more of CryptGenRandom, BCryptGenRandom, RtlGenRandom, ProcessPrng, GetTickCount, QueryPerformanceCounter, or a hardware-based random-number generator.

7. The method of claim 1, wherein the telemetry component operates in a multi-tier capture mode that:
   at a first suspiciousness threshold, records metadata describing calls to an entropy source; and
   at a higher suspiciousness threshold, records full values returned by the entropy source.

8. The method of claim 1 further comprising:
   tampering with an entropy source invoked by the process by substituting, in real time, pseudorandom values generated by a deterministic cryptographically secure pseudo-random number generator, and persisting a seed of the deterministic cryptographically secure pseudo-random number generator for later reconstruction of the ransomware encryption key.

9. The method of claim 1, further comprising:
   aggregating telemetry data from a plurality of monitored computing devices to dynamically adjust either of the first threshold or the second threshold.

10. The method of claim 1, further comprising:
    storing, by the telemetry component while disabled, a most-recent subset of key material for the process and providing retrospective access to the most-recent subset of key material if when the suspiciousness level score later exceeds the first threshold.

11. The method of claim 1, further comprising:
    extracting, by a file gathering component, metadata from each ransomware-encrypted file, the metadata comprising at least one of: an encryption algorithm identifier, a key length, a block size, or a file property; and
    selecting, based on the metadata, a key-derivation routine to be applied when reconstructing the ransomware encryption key.

12. The method of claim 1, wherein reconstructing the ransomware encryption key further comprises validating a candidate key by decrypting a portion of at least one ransomware-encrypted file and comparing the decrypted portion with an expected header, an expected footer, and/or magic number.

13. The method of claim 1, further comprising transmitting the captured key material and associated process identifiers to a remote monitoring platform via a secure messaging bus that employs end-to-end encryption.

14. The method of claim 1, further comprising remotely updating the telemetry component with revised entropy hooks or decryption logic when a new ransomware variant is identified.

15. A method for implementation by one or more computing devices comprising:
    identifying a process executing on a monitored computing device that invokes one or more entropy sources;
    in response to determining that a suspiciousness score associated with the process meets or exceeds a threshold, interposing a telemetry component between the process and at least one of the one or more entropy sources, the telemetry component hooking one or more operating-system entropy sources invoked by the process and recording metadata describing calls to the operating-system entropy sources when the suspiciousness score meets or exceeds a first threshold, the telemetry component recording full values returned by the one or more entropy sources when the suspiciousness score meets or exceeds a higher, second threshold;
substituting, in real time, pseudorandom values generated by a deterministic cryptographically secure pseudorandom number generator for values that would otherwise be returned by the at least one entropy source;
persisting a seed of the deterministic cryptographically secure pseudorandom number generator together with associated data sufficient to determine an order in which the pseudorandom values were supplied to the process;
reconstructing at least one ransomware encryption key used by the process by regenerating, from the persisted seed, the pseudorandom values supplied to the process and replaying a key-derivation routine implemented by a ransomware; and
decrypting ransomware-encrypted files using the reconstructed ransomware encryption key.

16. The method of claim 15, wherein the substituting is enabled only while the suspiciousness score meets or exceeds a third threshold and is disabled when the suspiciousness score falls below the third threshold, and wherein a higher suspiciousness score threshold triggers substituting at a higher level of capture than a lower, fourth threshold.

17. The method of claim 15, wherein interposing comprises hooking one or more operating-system entropy sources selected from CryptGenRandom, BCryptGenRandom, RtlGenRandom, ProcessPrng, GetTickCount, QueryPerformanceCounter, a hardware-based random-number generator, and a CPU instruction that returns random values.

18. The method of claim 15, wherein the deterministic cryptographically secure pseudorandom number generator comprises an AES-CTR-DRBG or Fortuna instance, and wherein persisting the seed includes storing the seed in association with at least one of a process identifier or a thread identifier.

19. The method of claim 15, further comprising validating a reconstructed ransomware encryption key by decrypting a portion of at least one ransomware-encrypted file and comparing the decrypted portion with an expected header, expected footer, and/or magic number.

20. The method of claim 15, further comprising transmitting the persisted seed and associated process identifiers to a remote monitoring platform via an end-to-end encrypted messaging bus.

21. A method implemented by one or more computing devices, comprising:
receiving, for a process executing on a monitored computing device, a suspiciousness level score indicative of a likelihood of ransomware activity;
while the suspiciousness level score is below a first threshold, maintaining, by a telemetry component, a rolling buffer containing a most-recent subset of key material generated or used by the process;
when the suspiciousness level score meets or exceeds the first threshold, hooking, by the telemetry component, one or more operating-system entropy sources invoked by the process and recording metadata describing calls to the one or more operating-system entropy sources;
when the suspiciousness level score meets or exceeds a higher, second threshold, recording, by the telemetry component, full values returned by the one or more operating-system entropy sources;
extracting, from ransomware-encrypted files on the monitored computing device, metadata comprising at least one of: an encryption algorithm identifier, a key length, a block size, or a file property;
selecting, based at least in part on the extracted metadata, a key-derivation routine;
reconstructing a ransomware encryption key using key material obtained from at least one of the rolling buffer or the recorded full values and the selected key-derivation routine; and
decrypting at least one of the ransomware-encrypted files using the reconstructed ransomware encryption key.

22. The method of claim 21, further comprising aggregating telemetry data from a plurality of monitored computing devices and dynamically adjusting at least one of the first threshold or the second threshold based on the aggregated telemetry data.

23. The method of claim 21, wherein recording metadata at the first threshold consumes fewer computing resources and yields less key material than recording full values at the second threshold.

24. The method of claim 21, further comprising remotely updating the telemetry component with revised entropy hooks or decryption logic responsive to identification of a new ransomware variant.

25. A system comprising:
at least one data processor; and
memory storing instructions, which when executed by the at least one data processor, result in operations comprising:
receiving, for a process executing on a monitored computing device, one or more suspiciousness level scores indicative of a likelihood of ransomware activity;
capturing, by a telemetry component, key material being created or otherwise used by the process, the key material characterizing entropy used by ransomware to generate a ransomware encryption key, the capturing comprising:
enabling capture of the key material by the telemetry component at a first level when the one or more suspiciousness level scores are at or above a first threshold;
enabling capture of the key material by the telemetry component at a second level when the one or more suspiciousness level scores are at or above a second threshold, the capturing at the second level (i) consuming a greater amount of computing resources than the first level and (ii) providing a greater amount of key material than the first level; and
disabling capture of the key material by the telemetry component when the one or more suspiciousness level scores are below the first threshold;
reconstructing the ransomware encryption key using the captured key material; and
decrypting ransomware-encrypted files using the reconstructed ransomware encryption key.

26. The system of claim 25, wherein the telemetry component captures the key material using one or more hooks into entropy sources forming part of an operating system executed by the monitored computing device.

27. The system of claim 25 further comprising:
obtaining, by a file gathering component, information about the ransomware-encrypted files;

wherein the obtained information is used to determine whether to use the ransomware encryption key to decrypt the ransomware-encrypted files.

28. The system of claim 25, wherein the obtained information comprises information derived from a header and/or footer of one or more of the ransomware-encrypted files, the header and/or footer specifying one or more of a utilized algorithm, a key length, or a utilized encryption tool.

29. The system of claim 25, wherein the obtained information comprises one or more of file size, block size, and file properties.

30. The system of claim 25, wherein capturing the key material further comprises: hooking at least one operating-system entropy source comprises one or more of CryptGenRandom, BCryptGenRandom, RtlGenRandom, ProcessPrng, GetTickCount, Query PerformanceCounter, or a hardware-based random-number generator.

* * * * *